United States Patent [19]

Piaggi

[11] Patent Number: 4,500,573
[45] Date of Patent: Feb. 19, 1985

[54] PROCESSES FOR MANUFACTURING SPECIFIC PRODUCTS SUITABLE FOR THE STORAGE, TRANSPORT, PREPARATION AND CONSUMPTION OF FOOD, AND DRINKS AND PRODUCTS OBTAINED BY SAID PROCESSES, SUCH AS PLATES, SOUP PLATES, VESSELS, CUPS, GLASSES AND THE LIKE

[76] Inventor: Alberto Piaggi, 542 Residenza delle Querce, Milano Due, Segrate (Milan), Italy

[21] Appl. No.: 442,033

[22] Filed: Nov. 16, 1982

[30] Foreign Application Priority Data

Nov. 18, 1981 [IT] Italy .................. 25161 A/81

[51] Int. Cl.³ .............. B29C 27/08; B65D 11/16
[52] U.S. Cl. .................................. 428/35; 156/70; 156/73.1; 156/228; 156/245; 156/277; 156/292; 156/303.1; 264/23; 264/250; 428/13; 428/66
[58] Field of Search ............ 156/73.1, 196, 228, 156/245, 277, 303.1, 70, 292; 428/35, 13, 66; 264/23, 250, 271.1

[56] References Cited

U.S. PATENT DOCUMENTS

| 2,149,507 | 3/1939 | Camfield | 156/228 |
| 3,074,840 | 1/1963 | Teplansky et al. | 156/245 |
| 3,334,001 | 8/1967 | Tyhurst | 156/228 |
| 3,483,066 | 12/1969 | Harris et al. | 156/73.1 |
| 3,578,539 | 5/1971 | Lash | 156/245 |
| 3,633,221 | 1/1972 | Addison | 156/277 |
| 3,808,084 | 4/1974 | Doty | 428/66 |
| 4,289,817 | 9/1981 | Valyi | 428/35 |

*Primary Examiner*—Michael Wityshyn
*Attorney, Agent, or Firm*—Laff, Whitesel, Conte & Saret

[57] ABSTRACT

The invention relates to processes for manufacturing specific products suitable for the storage, transport, preparation and consumption of food and drinks and products obtained by said processes, such as for example plates and soup plates, vessels and cups, glasses, etc. which first contemplate the preparation of specific injection molds for thermoplastic materials, more particularly a mold for the lower base piece of any color and a mold for the upper transparent piece matching with the inner surface of the first piece, then the molding of said pieces, the accomplishment of any kind of decorative designs indifferently obtained using paper, metal, textile, vegetable material supports or polyvinylchloride (P.V.C.) or similar material sheets, thermoformed in vacuum, either overprinted or not by means of any graphic photographic or engraving technique, the dinking of same and lastly the assembling of the different pieces by ultrasonic welding, i.e. the decorative insert is located on the lower colored piece and the upper transparent piece is laid thereon.

14 Claims, 14 Drawing Figures

PROCESSES FOR MANUFACTURING SPECIFIC PRODUCTS SUITABLE FOR THE STORAGE, TRANSPORT, PREPARATION AND CONSUMPTION OF FOOD, AND DRINKS AND PRODUCTS OBTAINED BY SAID PROCESSES, SUCH AS PLATES, SOUP PLATES, VESSELS, CUPS, GLASSES AND THE LIKE

FIELD OF THE INVENTION

The present invention relates to two processes for manufacturing specific products suitable for the storage, transport, preparation and consumption of food and drinks as well as to the products obtained by said processes, such as for example plates, soup plates, vessels, cups, glasses and the like.

BACKGROUND OF THE INVENTION

The general change which is taking place in life habits, the greater availability of free time, the possibility to move from one place to another have opened new important markets to products which are able to meet particular requirements. For example in the field of camping and picnic, there is an increasing tendency to adopt specialized outfits suitable for the storage, transport, preparation and consumption of food and drinks. Such new products remarkably differ from those used for the same purposes in normal houses, owing to the specific characteristics which are required from them; they must for example be unbreakable, light in weight, resistent, easy to wash and have a reduced bulkiness and a reduced price; in addition they must possess a new and different aesthetic appearance, brighter and more expressive as to shape and colours.

The arrival of new technologies and materials such as for example synthetic resins has allowed the industrial development of these productions, while modern distribution systems have helped their diffusion all over the different countries.

The field which absorbs a great deal of the production of the above mentioned market is formed by all things needed for a good running of a refectory, namely: plates and soup plates, vessels, cups, fruit and vegetables plates, trays, glasses and different accessories connected thereto.

Taking into account their field of utilization, the most important quality which is required to said articles is to be unbreakable, but it is also important for them to be hygienical, suitable to be superimposed in order to reduce their vertical bulkiness and aid their shifting, washable in water at a rather high temperature, considerably light in weight though sufficiently strong, as well as to have an agreeable aesthetic appearance if possible enriched with decorations.

Obviously said articles are not only used in the field of the free time but they are also used as children kitchenware, promotional articles and decorative articles of normal use in houses, snack-bars, restaurants, etc.

For what concerns the products actually on the market which are obtained by means of different materials and techniques and are therefore divided into different classes, we are going hereinafter to take into account and illustrate those products only which are of a durable kind and can be re-utilized; therefore no mention will be made either to tempered glass and metal productions, which on the other hand are not very suitable for the above stated purposes owing to their weight and to the noise they produce during the transferring, or to kitchenware of the traditional kind, that is chinaware, earthenware, etc.

The most diffused kitchenware is till now the one made of thermosetting resins (such as melamine and urea resins) notwithstanding its very high price. The technique for the production and decoration of this kind of kitchenware contemplates the following steps:

1st step: previous preparation of the decorated insert by means of offset lithography printing of the subject on covering paper made of pure cellulose, that is to say of a composition approaching the material used for the production of the piece.

2nd step: subsequent impregnation of the sheet with liquid malamine resin.

3rd step: dinking of the decorative insert.

4th step: molding of the piece, by heat compression of the resin in a suitable mold up to a value equal to about 50% of the total baking.

5th step: re-opening of the mold.

6th step: introduction of the decorative piece in the mold.

7th step: re-shutting of the mold and consequent completion of the molding step.

During the latter step the paper support of the decorative piece is literally dissolved in the piece which is going to be molded while the ornamental figure resisting to high temperatures owing to the thermoresistent qualities of printing inks used, is kept incorporated in an indelible and permanent manner onto the piece surface.

A further optional though useful operation provides the vitrification of the molded piece obtained by means of a further opening of the mold and consequent introduction of a small quantity of transparent melamine resin, that is free from cellulose, therein, which evenly distributes all over the surface of the piece to be molded when the mold is shut again.

The finished piece will then need a final snagging and finishing operation, owing to the presence of surplus material all around its external edge.

The main drawback of this procedure is represented by the laboriousness of operations necessary for its completion. Owing to the above reasons these articles have an anti-economic cost price (also due to some percent amount of waste pieces which can no more be salvaged) and, in addition, the production cannot meet the demand in due time. On the purpose, it is sufficient to keep in mind that about three minutes are necessary to complete a single molding cycle and therefore, even if more pieces are molded at the same time, the above procedure results almost of the manual art kind. Furthermore, in the pratical use these articles show a reduced abrasion and notch resistance above all where food is placed. Therefore the initial brightness of said surface and consequently of the decorated design is fading little by little, which inevitably reduces the use of a piece that, as to its other features, still appears as new.

Other kinds of kitchenware which are at present on the market are obtained by injection molding of thermoplastic resins (polystyrene, S.A.N., polypropylene, polyamides and so on). This kind of kitchenware is very common in an even colour being rather easy, quick and cheap to be produced; however there are on the market decorated articles too. There exist various procedures and techniques suitable for their production and decoration and for this reason only the most used ones will be hereinafter disclosed.

A first method contemplates a screen-printing process in one or more colours, directly on the molded piece. Inks used for the printing being however very thick, they give rise to some relief on the surface where food has to be placed, which is not very agreeable to the touch and which in addition suggests the idea that these materials are unsuited for getting into contact with food; of course these suspicions are very difficult to verify but are not probably ground-less.

A second method contamplates the possibility of placing an insert into the mold, before the molding of the piece, this insert being previously printed on a film of the same thermoplastic resin using the ordinary graphic techniques. This method, widely used in the past, is no more used at present owing to the poor resistance of the decorated surface which inevitably tends, by use, to exfoliate from the supporting surface.

A third method contemplates a screen-printing in one or more colours directly on the underneath surface of the transparent molded piece and therefore not in contact with food. However this method too does not meet the favour of the consumers because the pieces which are obtained can only be completely transparent and not in a full colour as universally preferred.

A last method contemplates the vacuum forming and subsequent shearing of a continuous thermoplastic material sheet formed by the matching of a support in an even colour with a transparent rotogravure printed film having an endless decorative design, the ink being turned toward the inner surface of the film, in order to avoid its contact with food. Each piece obtained by this process demands a manual finishing; furthermore the only kind existing on the market appears with wood imitating decorations and has to be used for vessels which do not need to be washed in hot water owing to its weak heat resistance. Finally a vessel obtained by this process is rather expensive and encounters many difficulties as to the possibility of varying its decorative designs. Therefore, the limits of the molded pieces obtained by the above processes, as to the aesthetic decoration, colouring and shape possibilities of same, can be synthetized as hereinbefore stated.

For what concerns the pieces obtained with thermosetting resins, the latter allow patterns either in even or in shaded colours (compatibly with the offset lithography printing) however, only when the piece ground is white or has a very light colour. It is not usually possible, for instance, to put white decorations on red grounds. It should also be noted that this kind of decoration is only possible on flat supporting surfaces or at the utmost on supporting surfaces having a weak bending radius. As an exception to these rules we may mention pieces having a peculiar shape, decorative inserts on heavier supports without any possibility of bending, and more complex workings; however the price of each finished piece in this case is even higher.

As to pieces obtained from screen-printed thermoplastic materials, decorations can be carried out in even colours only.

Lastly, as to pieces obtained by means of decorations previously printed on suitable inserts or thermoplastic films (either by injection molding or in vacuum), the same aesthetic limits as with thermosetting resins occur.

OBJECT

The object of the present invention is therefore to accomplish processes and corresponding products which may be able to overcome the present standstill period and to put on the market products (kitchenware) which are at the same time:

unbreakable and washable also in hot water;
light in weight, resistent, suitable to form a pile;
hygienical, being free from colouring and/or inking substances directly in contact with food;
of any desired colour;
decorated with designs disposed at the desired place, obtained in any desired even or shaded colour, on flat or on single or double bending surfaces having any desired bending radius;
suitable to be sold at a low price, proportionate to the limited use which is generally made of these products.

SUMMARY OF THE INVENTION

This problem is solved in accordance with the present invention, by two specific processes for manufacturing products suitable for the storage, transport, preparation and consumption of food and drinks, which contemplate the assembling of three pieces for the formation of a single product, for example a plate: a lower coloured piece, an upper transparent piece, firmly and tightly joined together by means of a circumferential ultrasonic welding around the outer edge thereof and a third intermediate piece carrying the decorative design.

The first process for the manufacture and assembling of said component pieces is characterized in that it provides the below stated steps:

1st step: preparing of two specific molds for the injection of thermoplastic materials (polysthyrene, polymethacrylate, etc.) which can be joined together by means of an ultrasonic welding, one mold being suitable for the lower base piece in any colour and the other for the upper piece which must be completely transparent and match with the inner surface of said first piece.

2nd step: molding of the above two pieces either simultaneously on two different machines or alternately on one machine only.

3rd step: carrying out of any decorative inserts obtained with paper, metal, textile, vegetable material supports, etc. either overprinted or not by means of any graphic photographic or engraving technique.

4th step: dinking of said inserts obtained in this way.

5th step: assembling of the different pieces, i.e. the decorative insert is located on the lower piece and the upper transparent piece is laid thereon.

6th step: welding, by ultrasonic vibrations, of the circumferential edges of the lower coloured base piece and of the upper transparent piece respectively.

The second process is characterized in that it comprises the following steps:

1st step: preparing of two specific molds for the injection of thermoplastic materials which can be joined together by means of an ultrasonic welding, one mold being suitable for the lower base piece in any colour and the other for the upper piece which must be completely transparent and match with the inner surface of said first piece.

2nd step: molding of the above two pieces either simultaneously on two different machines or alternately on one machine only.

3rd step: carrying out of any decorative inserts, preferably obtained by offset lithography or screen-printing on polyvinylchloride sheets (P.V.C.) or on a material having the same characteristics and subsequent thermoforming in vacuum.

4th step: dinking, according to a desired development, of printed and thermoformed P.V.C. sheets.

5th step: assembling of the different pieces, i.e. the decorative insert on a P.V.C. support, printed and thermoformed, is located on the lower piece and the upper transparent piece is laid thereon.

6th step: welding, by ultrasonic vibrations, of the circumferential edges of the lower coloured base piece and of the upper transparent piece respectively.

Further features and advantages will become more apparent from a detailed description of the above mentioned processes and of the products obtained by same, given hereinafter by way of example only, with reference to the accompanying drawings.

DESCRIPTION OF THE PREFERRED EMBODIMENTS

Figure 1:
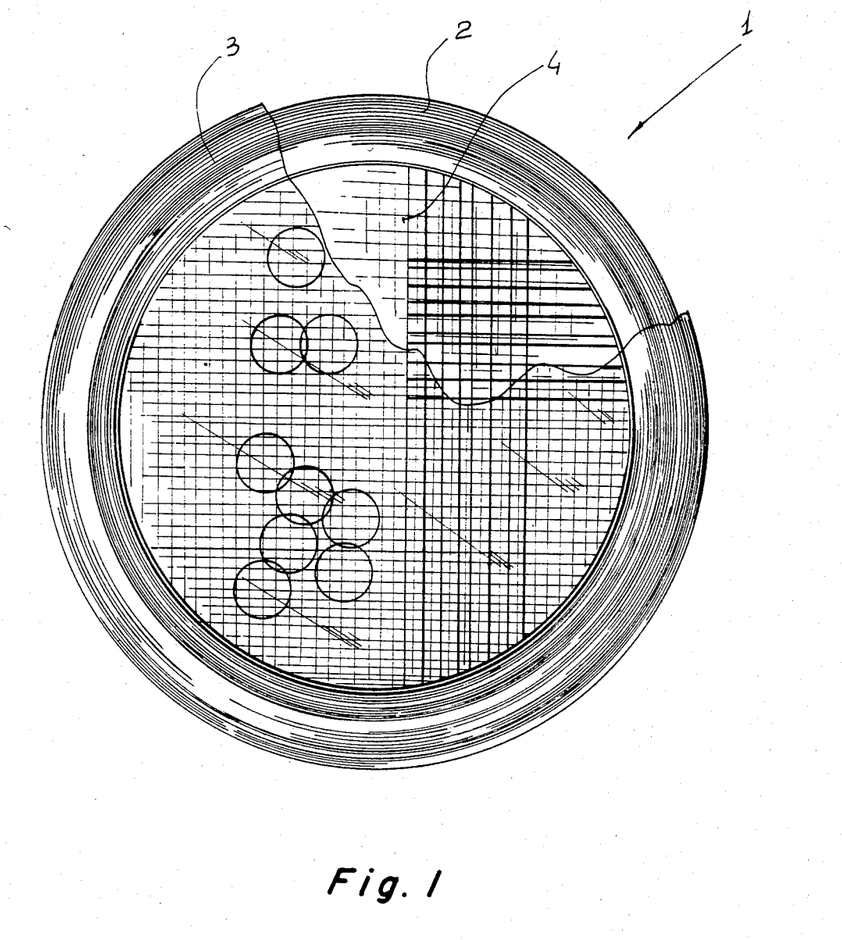
FIG. 1 is a part broken plan view of a plate according to the invention.
Figure 2:
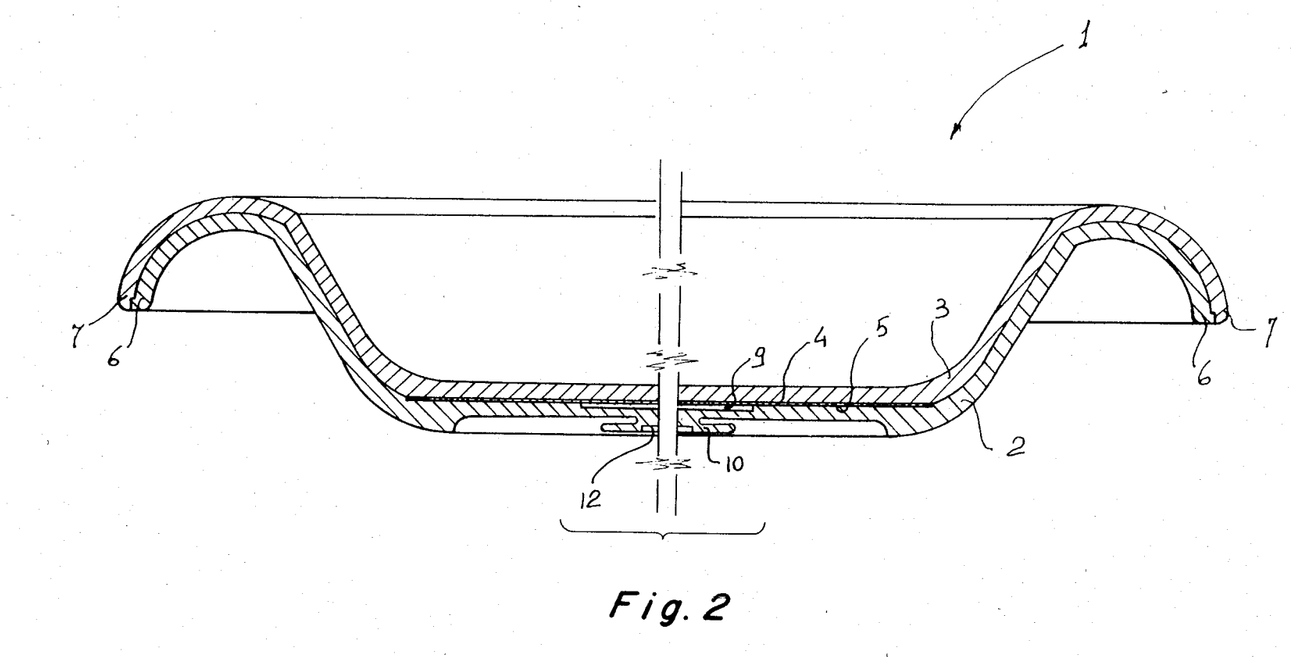
FIG. 2 is a sectional view of a plate as obtained in accordnce with the first process.

Referring to said figures and particularly to FIGS. 1 and 2, it has been generally indicated at 1 a flat plate as obtained by adopting the first process of the present invention; more particularly a plan view of said plate is shown in FIG. 1 and a cross sectional view of same is shown in FIG. 2.

As is seen in FIG. 2, plate 1 consists of a first base element 2, a second element 3 laying thereon and a decorative insert 4 interposed between elements 2 and 3. Elements 2 and 3, made of thermoplastic material (polystyrene, polymethacrylate, etc.) suitable to be welded by ultrasonic vibrations, are obtained by injection molding. The base element 2 can have any colour and shade while element 3 must be completely transparent.

Always referring to FIG. 2, the lower surface of element 3 is complementary to the upper surface of element 2. The decorative insert 4, located in a housing 5 formed during the molding in correspondence of the inner flat surface of said base element 2, can be obtained using paper, metal, textile or vegetable material supports indifferently, which are overprinted or not by means of any graphic, photographic or engraving technique. According to the first process of the present invention the two elements 2 and 3 are welded by ultrasonic vibrations close to their circumferential edges.

Figures 4, 4A:
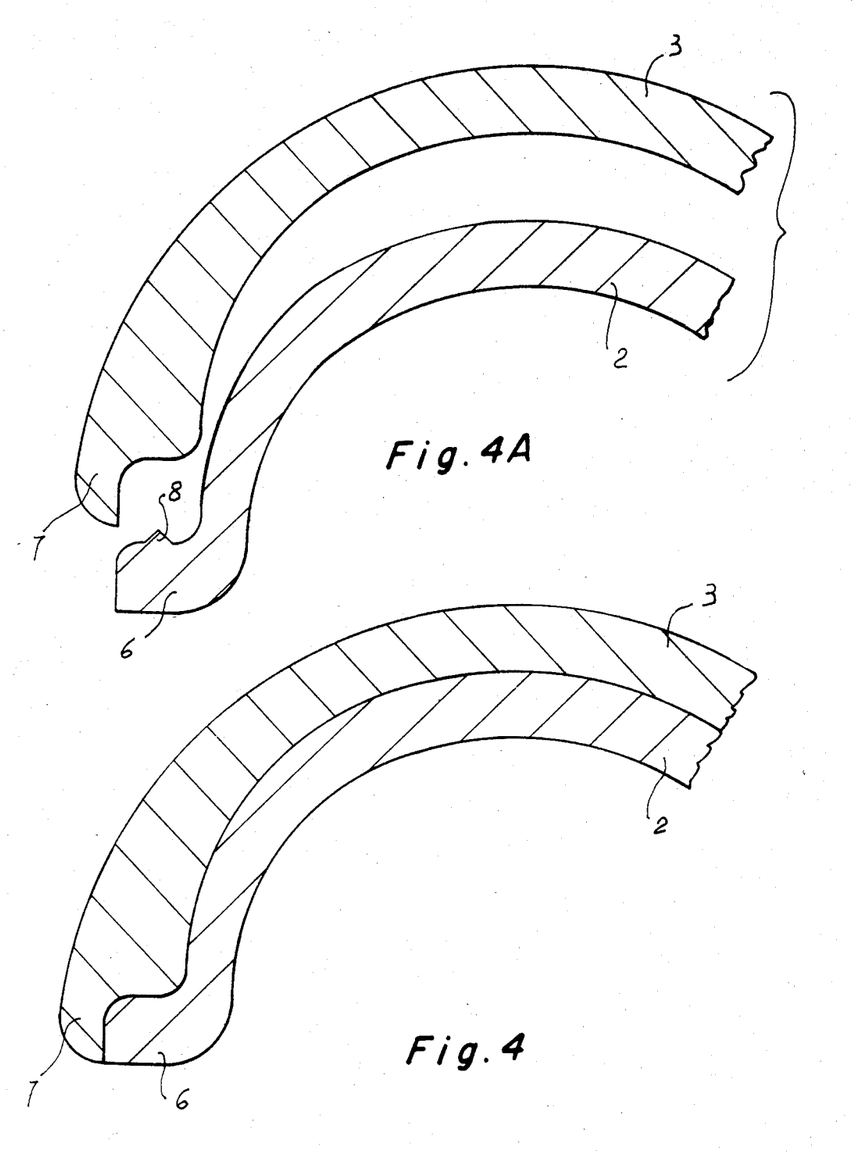
FIG. 4 is a sectional view on an enlarged scale of the detail concerning the joining of the circumferential edges of the two superimposed pieces forming the plate.

Said circumferential edges 6 and 7 are shown in FIG. 4 to an enlarged scale as they appear before and after the ultrasonic welding. As is clearly seen in this figure, before the welding the circumferential edge 6 of the element 2 has a relief 8 of a triangular section which disappears when the welding has been carried out and therefore the two pieces 6 and 7 are closely joined together.

Close to the central zone of the inner flat surface of the base element 2 is a blind hole 9 in which is obtained the point of attachment of a deadhead during the injection molding step. When the plate 1 is assembled and finished, said blind hole 9 disappears being covered by the decorative insert 4 disposed on it, also disappearing any possible surface discontinuity due to the injection molding operation.

A structure 10 is also obtained in correspondence of the outer flat supporting surface of the base element 2, said structure being suitable to be bayonet coupled with specific wall bearings 11 or being adapted for flat surfaces such as 12.

Figure 6:
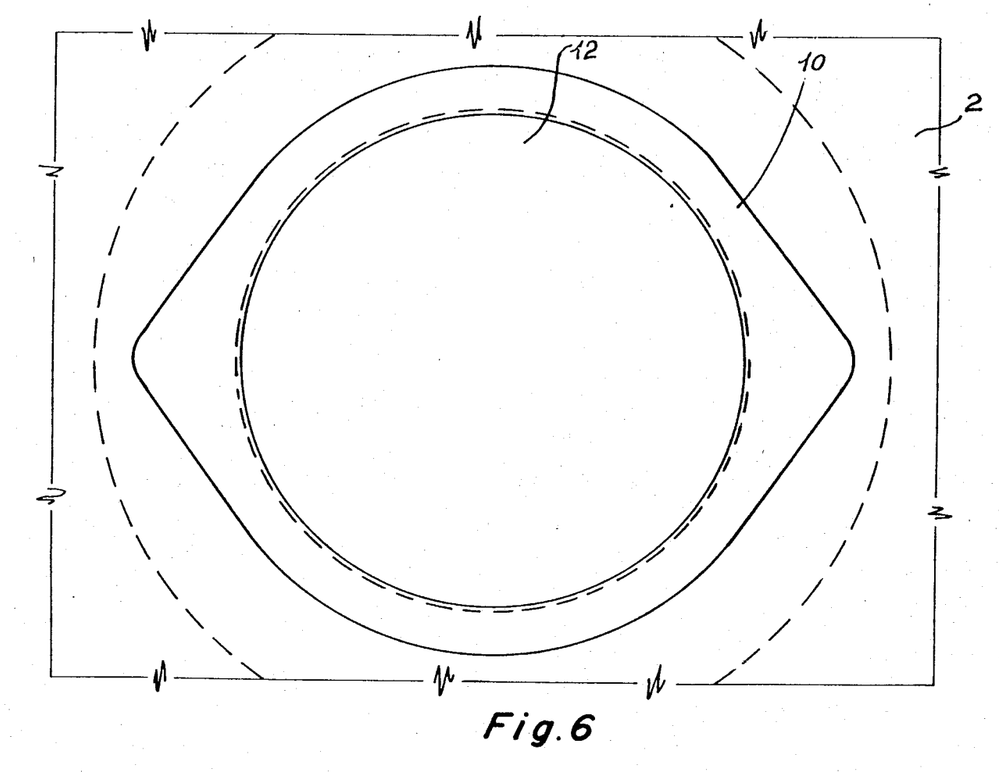
FIG. 6 is a partially plan view of the outer bottom of the plate which is provided with any structure suitable to fix the same to any surface.

FIG. 6 shows a partially broken plan view of structure 10 on an enlarged scale, where it is possible to see that a through hole 12 is formed coaxially to said structure 10 in order to make the piece lighter.

Figure 7:
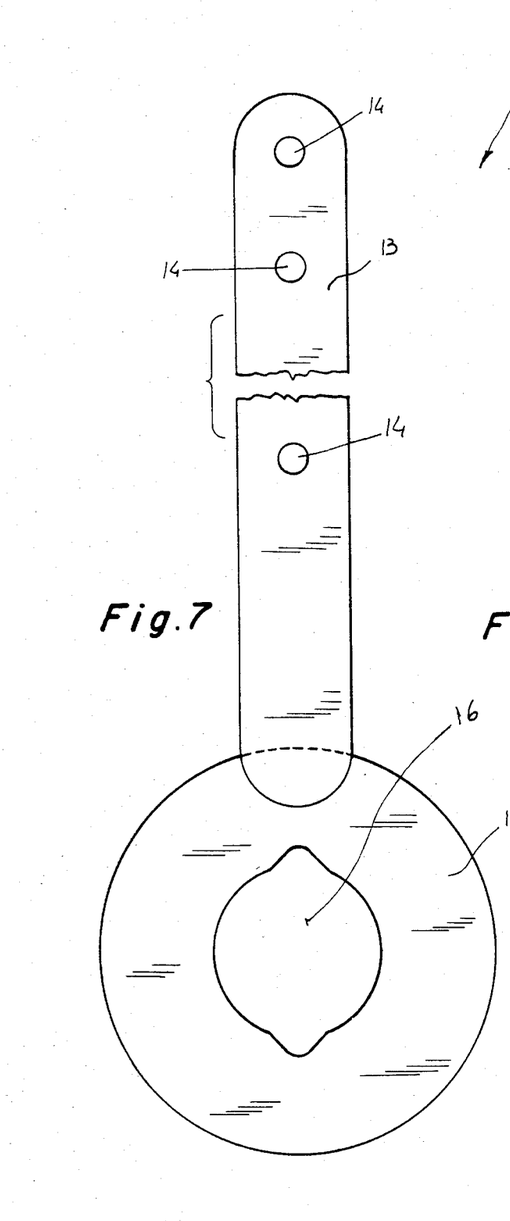
FIG. 7 is a plan view and a cross sectional view of a wall bearing.
Figure 7A:
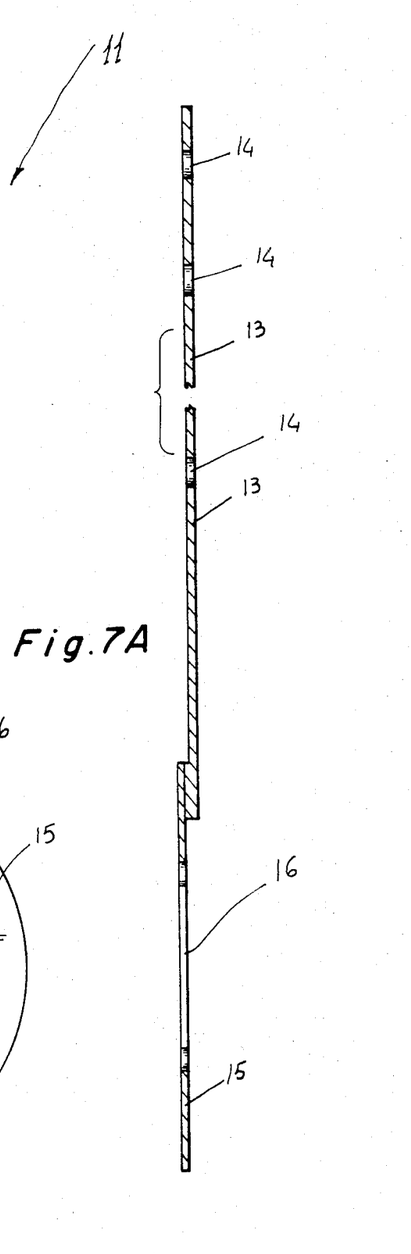

The wall bearing generally indicated at 11 consists of two elements forming a single body, i.e. a strip 13 provided with holes 14 where are introduced screws in order to enable the same to be wall fastened and a disc-shaped element 15 disposed at one end of said strip and having a hole 16 in the middle enabling a bayonet coupling with said structure 10.

Figure 8:
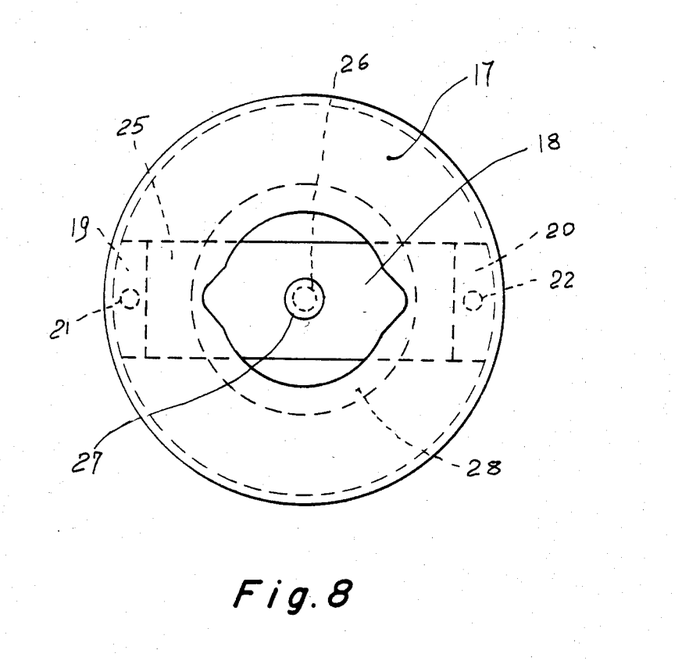
FIG. 8 is a plan view and a cross sectional view of a suction cup bearing suitable for horizontal planes.
Figure 8A:
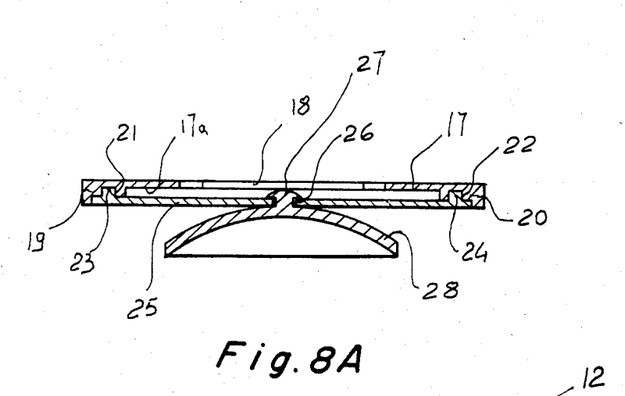

The support for flat surfaces generally indicated at 12 consists of a disc-shaped element 17 centrally provided with a hole for a beyonet coupling 18 quite similar to that of the wall bearing 11. The disc 17 is also provided on its base surface 17a with two pieces of added material 19 and 20 disposed at two diametrically opposed zones of said disc 17, in which two blind holes 21 and 22 are obtained, in said holes being firmly engaged two pins 23 and 24 formed at the free ends of a strip 25 which in turn is centrally provided with a through hole 26; pins 23 and 24 are fixed in holes 21 and 22 by ultrasonic welding.

A mushroom-shaped expansion rubber element 27 engages with a through hole 26 of strip 25, said rubber element being the connection element between strip 25 and therefore disc 17, and a suction cup 28 disposed below.

Figure 9:
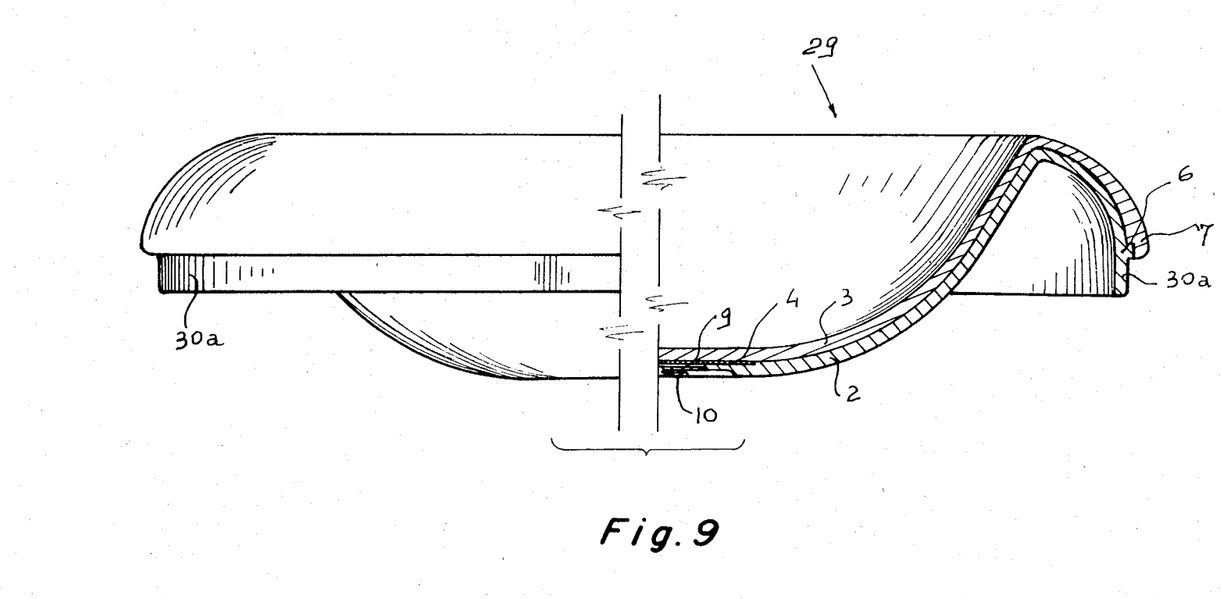
FIG. 9 is a sectional view of a soup plate as obtained by the first process.
Figure 10:
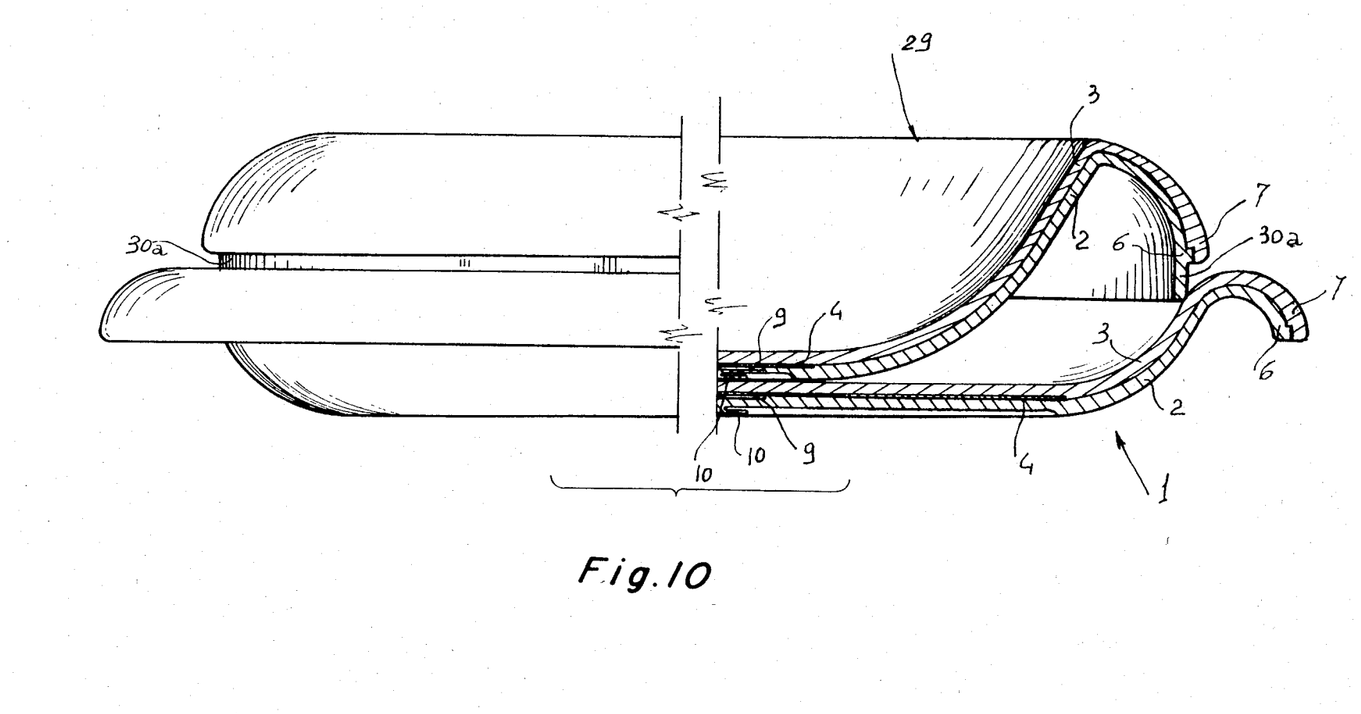
FIG. 10 is a part sectional view of the assembly flat plate-soup plate as obtained for example by the first process.

Furthermore, in FIGS. 9 and 10 are shown a soup plate 29 and the same soup plate 29 placed on the corresponding flat plate 1 respectively, always obtained by the process in accordance with the present invention.

It should be noted that the structural differences between soup plate 29 and flat plate 1 are merely due to the fact that soup plate 29 has a greater capacity than flat plate 1, which means that the bending radii of elements 2 and 3 are different in the two plates.

Furthermore, the base element 2 is provided on its outline with a downwards vertical extension 30a which, when the soup plate 29 is place inside the flat plate 2, forms an annular rim suitable to abut against the circumferential rising edges of the flat plate 1, thus avoiding any sliding between the soup plate 29 and the flat plate 1. That is clearly seen in FIG. 10.

Figure 3:
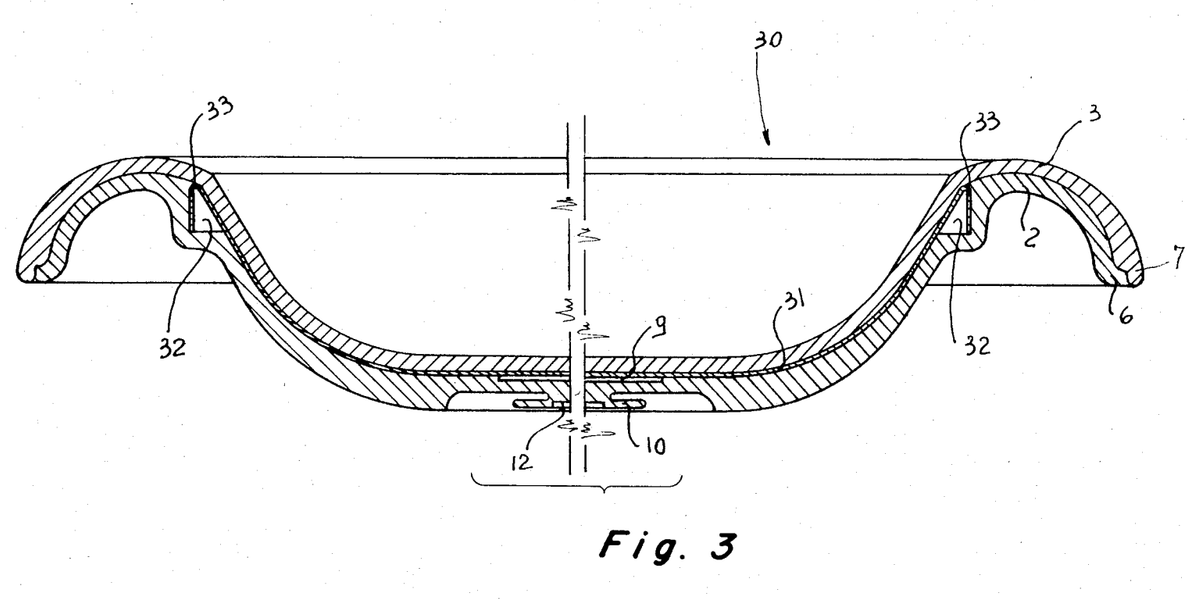
FIG. 3 is a sectional view of a plate as obtained in accordance with the second process.

Referring particularly to FIG. 3, there is shown, by way of example, a flat plate generally indicated at 30 as it is obtained by the second process of the present invention.

It can be seen that also plate 30 consists of a first base element 2 and a second superimposed element 3, firmly joined together by means of an ultrasonic welding on their corresponding circumferential free edges, a decorative insert 31 being introduced therebetween. According to said second process, the base elements 2 and 3 are obtained by injection molding and the decorative inset 31 is obtained from polyvinylchloride (P.V.C) sheets or in any way from materials having the same characteristics and carrying any kind of decorative designs preferably obtained by offset or screen-printing or by adopting the ordinary graphic or photographic techniques, then thermoformed in vacuum and punched. In this case too the base element 2 can be accomplished in any colour and shade while the upper element 3 is completely transparent.

Always referring to FIG. 3, it is to be noted that the lower surface of element 3 is complementary to the upper surface of element 2, except a zone disposed in correspondence of the rising circumferential edges of said two elements 2 and 3 where an annular chamber 32 is created.

The decorative insert 31 which is interposed, when the plate is assembled and finished, between said elements 2 and 3 is provided with a curl-shaped structure 33 along its circumferential free outline, which is introduced in said annular chamber 32.

Figures 5, 5A:
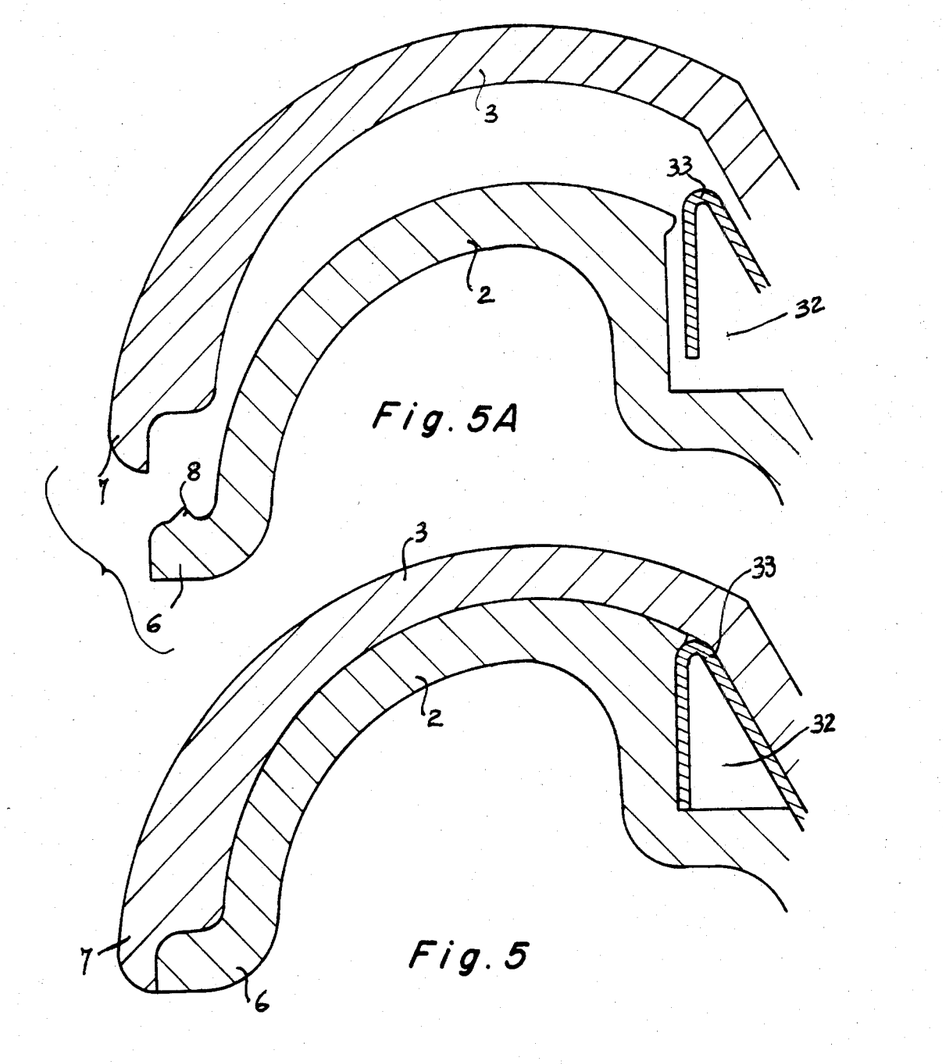
FIG. 5 is a sectional view to an enlarged scale of the detail concerning the introduction of the P.V.C. sheet between the two superimposed pieces.

FIG. 5 is a view to an enlarged scale of the detail concerning the introduction of curl 33 of the decorative insert 31 into the annular chamber 32 and of the joining, by ultrasonic welding, of the circumferential edges of elements 2 and 3 forming the plate 30.

After considering the above description, it becomes apparent that the advantages resulting from the adoption of the above processes in order to obtain specific products suitable for the storage, transport, preparation and consumption of food and drinks such as for example flat and soup plates, vessels and cups, salad bowls, glasses and other articles indispensable to the good running of a refectory can be summarized as follows:

owing to the particular characteristics of resins used, said kitchenware is unbreakable, washable also in hot water and at the same time light in weight, resistent and hygienical;

owing to its particular and expressly studied shapes, said kitchenware can be piled up and therefore can be easily transferred without occupying much room;

owing to the particular procedures adopted said kitchenware's decorations can be accomplished in any desired even or shaded colour and they can represent any subject on the whole useful surface thereof and surfaces to be utilized can be either flat or with a single or double bending, the bending radius being whatever.

In addition, the adoption of said processes allows cheap selling prices and high production rates. In fact, a considerable amount of finished products in a short time and with reduced equipments can be obtained, by simultaneously adopting particular techniques such as the injection molding of thermoplastic materials by means of automatic cycle presses on one hand and particular procedures to print decorations using quick multicolours offset presses on the other hand, while a quick assembling is assured by ultrasonic welding.

Obviously, though the embodiments described hereinbefore are the preferred ones, modifications and chnages can be made as to processes used and products obtained which for the sake of simplicity have been described with reference to flat and soup plates only, without departing from the spirit and scope of this invention as defined in the appended claims.

What is claimed is:

1. A process for peparing a multi-layered decorative plastic article for holding food comprising
    injection molding a second element having an inner surface, an outer surface and an outer lip, said second element being injection molded from plastic which is adapted to hold food, and said outer surface being shaped to be in contact with said food,
    injection molding a first base element having an inner surface, an outer surface and an outer lip, said base element inner surface and outer lip being molded so that it is substantially complementary with the second element inner surface and outer lip,
    providing a decorative insert, said decorative insert having at least one surface thereof with a decoration thereon,
    injection molding at least one of the first or second elements inner surfaces to accomodate said decorative insert therebetween and provide a complementary fit between the inner faces of the first and second elements,
    injection molding at least one of the first and second elements with plastic material that forms a transparent plastic after molded,
    inserting the decorative insert between the inner faces of the first and second elements,
    ultrasonically welding the first element to the second element to thereby provide the desired multilayered food holder.

2. The process of claim 1 wherein both the first and second elements are prepared with food compatible plastic material.

3. The process of claim 2 wherein the plastic material is selected from the group consisting of polystyrene and polymethacrylate.

4. The process of claim 3 wherein the first and second elements ae formed to have outer complementary lips and the first and second elements are joined by ultrasonically welding the lips.

5. The process of claim 1 wherein the first and second elements are formed to have outer complementary lips and the first and second elements are joined by ultrasonically welding the lips.

6. The process of claim 5 wherein the inner surfaces of the first and second elements are provided with means to hold the decorative insert therebetween when the first and second elements are joined.

7. The process of claim 6 wherein the outer surface of the second layer is molded to provide a recessed male bayonet coupling.

8. A multilayered plastic food holder comprising:
    a second injection molded plastic element having an inner surface, an outer surface and an outer lip, said outer surface being the surface to hold or be in contact with food,
    a first injection molded plastic base element having an inner surface, an outer surface and an outer lip,
    a separate decorative insert being positioned between the inner surfaces of said first and second elements,
    said inner surfaces of said first and second elements being adapted to hold said decorative insert and being complementary with each other,
    at least one of said first and second elements being formed of transparent plastic to enable the decorative layer to be visible therethrough, said first and second elements being joined together by ultrasonic welding.

9. The holder of claim 8 which is a soup plate wherein said first base element is also provided on its outer surface with a downwards vertical extension which, when the soup plate is place inside a flat plate, forms an annular rim suitable to abut against the circumferential rising edges of the flat plate.

10. The holder of claim 8 which is a plate wherein the first base element has means on its outer surface suitable to enable the plate to be wall fastened or fixed to flat surfaces, and the inner surface of the first base element provides a housing for the decorative insert.

11. The plate of claim 10 wherein the complementary joined inner surfaces of the first and second elements define an annular hollow space, said decorative insert being a polyvinylchloride sheet, said sheet carrying a decorative design preferably obtained by offset lighography or screen-printing and having on its decorative free circumferential outline a curl-shaped structure, which is housed within the annular hollow space obtained by joining said two elements.

12. The plate of claim 10 wherein said means suitable to enable the plate to be wall fastened or fixed to flat surfaces comprises a male bayonet coupling formed in the outer surface of the base element.

13. The plate of claim 12 which further has in combination therewith a wall bearing being formed with two elements forming a single body, one element being a strip provided with screw holes to enable the bearing to be wall fastened and the second element being a disc-shaped element disposed at one end of said strip and having a hold in the middle forming a female bayonet coupling.

14. The plate of claim 12 which further has in combination therewith a flat surface holder for the plate comprising a disc-shaped element centrally provided with a hole forming a female bayonet coupling, said disc being also provided on its base surface with two pieces of added material disposed at two diametrically opposed zones, said two pieces being joined by ultrasonic welding to said disc, a strip being joined to the two pieces and spaced from the disc, a hole centrally provided in said strip, said hole being a retainer for a mushroom-shaped expansion rubber element of a suction cup.

* * * * *